United States Patent
Robey

[11] Patent Number: 6,162,162
[45] Date of Patent: Dec. 19, 2000

[54] CENTRIFUGAL EXTRACTION APPARATUS

[75] Inventor: Raymond John Robey, Naperville, Ill.

[73] Assignee: Praxair Technology, Inc., Danbury, Conn.

[21] Appl. No.: 09/478,203

[22] Filed: Jan. 5, 2000

Related U.S. Application Data

[62] Division of application No. 09/276,668, Mar. 26, 1999, Pat. No. 6,036,630.

[51] Int. Cl.$^7$ .................................................. B04B 5/06
[52] U.S. Cl. .................................... 494/22; 494/900
[58] Field of Search ...................... 494/22, 31, 33, 494/42, 43, 60, 76, 900; 422/256, 258, 259

[56] References Cited

U.S. PATENT DOCUMENTS

| | | | |
|---|---|---|---|
| 2,044,996 | 6/1936 | Podbielniak | 261/83 |
| 2,176,983 | 10/1939 | Thayer | 422/259 |
| 2,281,796 | 5/1942 | Podbielniak | 494/22 |
| 2,785,765 | 3/1957 | Cornell | 494/61 |
| 3,027,389 | 3/1962 | Thurman | 494/22 |
| 3,027,390 | 3/1962 | Thurman | 494/22 |
| 3,107,218 | 10/1963 | Doyle | 494/22 |
| 3,233,880 | 2/1966 | Podbielniak | 494/900 |
| 3,443,748 | 5/1969 | Hooper | 494/900 |
| 3,486,743 | 12/1969 | Todd | 494/22 |
| 3,774,840 | 11/1973 | Boatright | . |
| 3,809,375 | 5/1974 | Bonnet | 261/87 |
| 4,030,897 | 6/1977 | Pelzer et al. | 494/61 |
| 4,225,079 | 9/1980 | Yoshinaga et al. | . |
| 4,382,900 | 5/1983 | Wem | 261/89 |
| 4,956,052 | 9/1990 | Hirata et al. | . |
| 5,254,075 | 10/1993 | Nemoto et al. | 494/35 |
| 5,288,511 | 2/1994 | Kazlas et al. | . |
| 5,312,635 | 5/1994 | Kazlas et al. | . |
| 5,363,909 | 11/1994 | Acharya et al. | . |

OTHER PUBLICATIONS

Chin et al., "Supercritical Fluids Stay Solvent", Chemical Engineering (1998).

*Primary Examiner*—Charles E. Cooley
*Attorney, Agent, or Firm*—Donald T. Black

[57] ABSTRACT

A process for extracting a component from liquids using dense phase gases or supercritical fluids (dense phase solvent). The process contacts a liquid and the dense phase solvent in a rotating mixer to dissolve a desired fraction into the dense phase solvent to form a loaded solvent. Furthermore, the mixer separates the loaded solvent from the remaining raffinate. Then the rotating mixer discharges the loaded solvent and raffinate. Decreasing pressure on the loaded solvent converts the loaded solvent into a gas and the desired fraction to liberate the desired fraction from the gas.

2 Claims, 2 Drawing Sheets

CENTRIFUGAL EXTRACTION APPARATUS

This is a Division of prior U.S. application(s) Ser. No. 09/276,668, Filing Date: Mar. 26, 1999, now U.S. Pat. No. 6,036,630.

BACKGROUND OF THE INVENTION

1. Field of the Invention

The present invention relates to a process and system for removing a desired fraction from a liquid using a centrifugal extractor.

2. Description of Related Art

Extraction processes using dense phase (i.e., a supercritical fluid or a liquefied gas) solvents have been in commercial operation for 50 years. Extraction from solid materials has been done in a batch manner, periodically stopping the extraction process to depressurize, unload, reload, and repressurize the extraction vessel prior to resuming extraction. Multiple batch extraction vessels in series, with the periodic removal of a single vessel from the extraction train, have reduced but not eliminated the lost processing time. For example, U.S. Pat. Nos. 5,288,511 and 5,312,635 to Kazlas et al. disclose using supercritical carbon dioxide in batch processes to decaffeinate acidified coffee and to remove oil from fried food products, respectively.

The processing equipment used in continuous extractions consists of vertical cylindrical columns similar to that used for low-pressure distillation or liquid-liquid extraction. This equipment operates in either a batch or continuous manner to extract components from a variety of sources.

Prior art solutions to the problem of increasing production rates in the extraction of liquids with dense phase solvents have been limited to the application of various distributors in vertical cylindrical columns. More recent attempts have been described in U.S. Pat. No. 4,956,052 to Hirata et al. As in liquid-liquid extraction, the use of different distributors reduces the vertical circulation of the continuous phase and promotes high interfacial contact between the dispersed and continuous phases. All of these solutions, however, are limited by the force of gravity to effect the counterflow of liquids of different density.

Notwithstanding prior art solutions, a problem associated with the commercial utilization of dense phase solvent extraction processes continues to be the high processing cost, relative to alternate extraction methods. This high processing cost, due principally to limited production rates in capital intensive process equipment, has limited the application of dense phase extraction processes to high-value products.

These products are typically produced in small volumes and by a small number of processors, inherently limiting the wide-scale utility of this technology. An extraction process that results in reduced processing costs due to increased production rates would facilitate extending the utilization of this technology to a greater range of products.

Centrifugal extractors, such as Podbielniak and Westfalia extractors, increase production capacity in liquid-liquid extraction systems and overcome the limitations of gravity as the driving force for separation. For example, U.S. Pat. No. 2,044,996 to Podbielniak, combines the advantages of multi-stage countercurrent contact of two fluid phases with the ability of a centrifuge to process large volumes of material quickly in a small compact device. Similarly, Wem, in U.S. Pat. No. 4,382,900, discloses a centrifugal gas-liquid apparatus that relies upon an annular packing of gas/liquid permeable material in the extractor. The extractor rotates to force liquid radially outward through the permeable material with centrifugal force where it encounters a gas before exiting through a separate chamber. Similarly, the gas passes through the liquid and permeable material and exits through a gas outlet. These centrifugal extractors only operate with liquid-liquid or gas-liquid systems.

Bearing in mind the problems and deficiencies of the prior art, it is therefore an object of the present invention to provide an extraction process and apparatus that result in reduced processing costs due to increased production rates.

It is another object of the present invention to provide a process and apparatus that will permit the continuous processing of large volumes of liquids with dense phase fluids in a smaller, more compact device.

Still other objects and advantages of the invention will be apparent from the specification.

SUMMARY OF THE INVENTION

The above and other objects and advantages, which will be apparent to one of skill in the art, are achieved in the present invention, which is directed to, in a first aspect, a process for extracting a component from liquids. First it provides a liquid containing a desired fraction to be extracted and a dense phase solvent for extraction of the desired fraction. The dense phase solvent is chosen from the group consisting of supercritical fluids and liquefied gases. This solvent has a different density than the liquid. Then contacting the liquid and the dense phase solvent in a rotating mixer dissolves the desired fraction into the dense phase solvent by forming a loaded solvent. Furthermore, the mixer separates the loaded solvent from the remaining raffinate with centrifugal force. The mixer operates with sufficient internal pressure to maintain the desired fraction dissolved in the dense phase solvent. Then the rotating mixer discharges the loaded solvent and raffinate. Finally, decreasing pressure on the loaded solvent converts the loaded solvent into a gas and the desired fraction and liberates the desired fraction from the gas.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description that follows taken in conjunction with the accompanying drawings in which:

DESCRIPTION OF THE PREFERRED EMBODIMENT(S)

Figure 1:
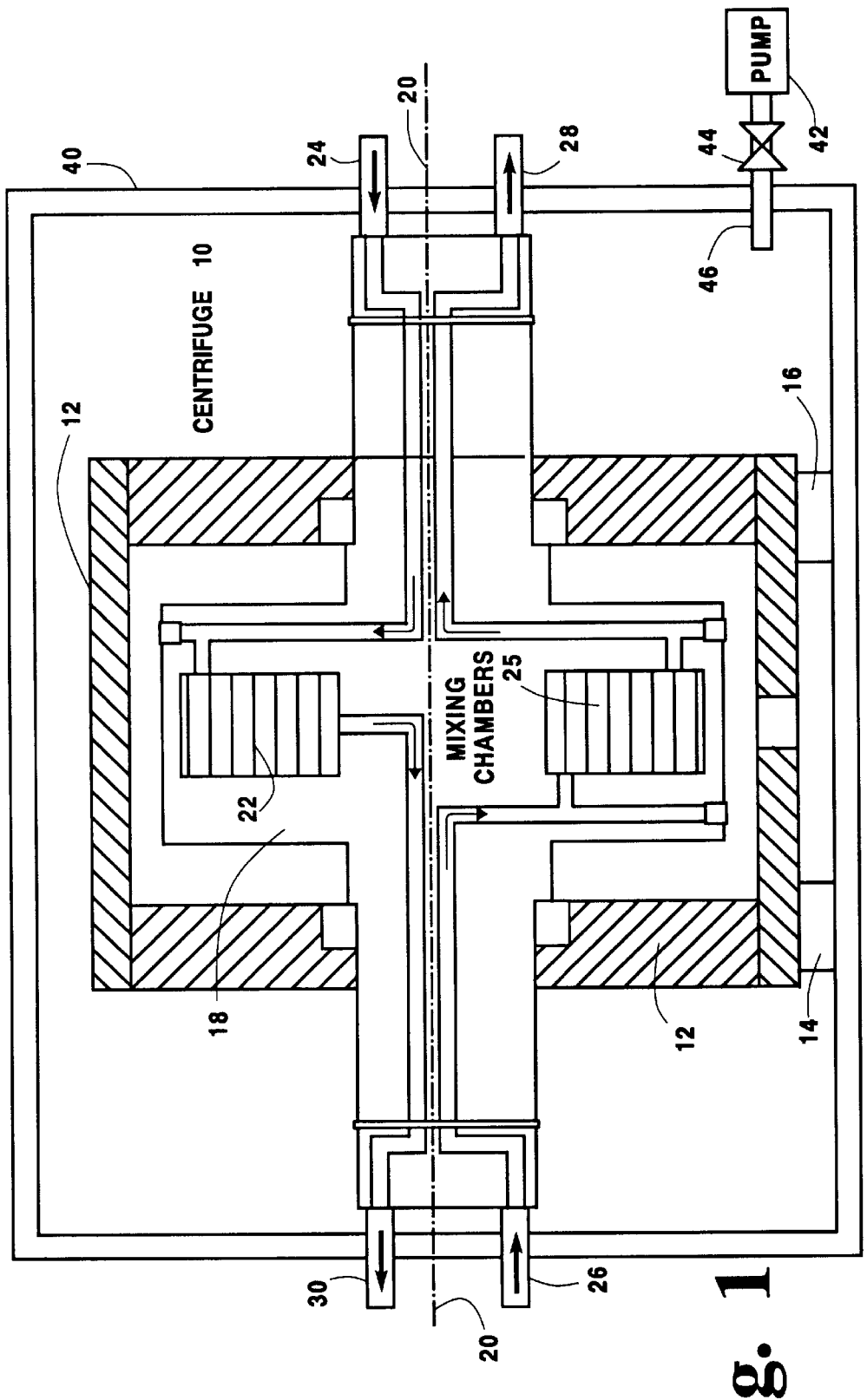
FIG. 1 is a schematic view, partially in cross-section, of the centrifugal extractor.

In describing the preferred embodiment of the present invention, reference will be made herein to FIGS. 1 and 2 of the drawings where the numerals refer to like features of the invention. Features of the invention are not necessarily shown to scale in the drawings.

The present invention is directed to a dense phase extraction process that relies on a centrifugal extractor modified to operate at pressures sufficient to maintain the solvent in its dense phase. For purposes of this specification, dense phase includes liquefied gases, supercritical fluids and mixtures containing these. It has been unexpectedly found that, by employing processing advantages of a centrifugal extractor, there may be achieved further enhancement of the unique extraction properties of dense phase fluid solvents. This invention permits the continuous processing of large volumes of liquids with dense phase fluids in a centrifugal extractor.

For example, the various liquids to which the dense phase extraction process and apparatus of the present invention may be applied include: plasticizer recovery, monomer purification, fine chemical production, flavor extraction and fragrance extraction. These liquids generally have a density of about 0.6 to 1.6 g/cc.

The various dense phase solvents that serve as extractants for the aforementioned fractions or impurities in the product liquids may for example include: liquefied carbon dioxide, supercritical carbon dioxide, ammonia, ethane, ethylene, propane, propylene, butane, other hydrocarbon gases, nitrous oxide, $CFCl_3$, $CF_3Cl$, other halogenated hydrocarbons and mixtures thereof. These solvents generally have a density of about 0.3 to 1.0 g/cc.

The preferred dense phase solvent for several systems is supercritical carbon dioxide. Liquid carbon dioxide exists at any temperature between the triple point temperature of −56.6° C. and the critical point temperature of 31° C. by compressing the carbon dioxide to the liquefaction pressure. At a temperature of from about 0° C. to 30° C., the liquefaction pressure is 5.5 MPa (505 psia) to 7.2 MPa (1046 psia). Advantageously, the carbon dioxide solvents operate with a liquefaction pressure of at least about 5 MPa (750 psia). Most advantageously, carbon dioxide solvents operate as a supercritical fluid. Supercritical carbon dioxide exists at a temperature at or above 31° C. and a pressure at or above 7.4 MPa (1070.16 psia). Supercritical carbon dioxide (like other supercritical solvents) is neither liquid nor vapor, but combines some of the solvent and transport properties of each.

FIG. 1 illustrates a modified centrifugal extractor found to have particular advantages in the preferred mode of operation of the present invention.

The body of a centrifugal extractor 10 consists of a cylindrical housing 12 supported by legs 14 and 16. Inside the housing 12, a rotatable mixer or centrifuge 18 rotates about its horizontal axis 20. The centrifuge 18 contains a number of spaced concentric cylinders 22 having perforations or openings therein. Between the cylinders, and formed thereby, are a plurality of discrete mixing regions or chambers 25 that serially interconnect from near the axis 20 to near the periphery of the housing 12.

For most extraction processes, a dense phase solvent enters a light phase conduit or inlet 24 and a liquid enters a heavy phase inlet 26 to supply the extractor—when the solvent has a greater density than the liquid, the solvent enters the inlet 26 and the liquid enters the inlet 24. In order for the centrifuge to effectively separate the dense phase from the liquid, the fluids must have different densities. Spinning the centrifuge causes the solvent and liquid to flow in opposite directions through the chambers 25 between the concentric cylinders 22 and through the aforementioned perforations or openings in the cylinders 22 into successive chambers 25. The high density liquid flows to the periphery and the low density solvent travels inwardly. As the fluids travel within the concentric cylinders, the solvent contacts the liquid to dissolve or extract a desired fraction or component from the liquid and form a loaded solvent and a raffinate.

After the loaded solvent reaches the periphery of the centrifugal extractor 22, it exits through a high density outlet 28. Similarly, the raffinate exits near the centrifuge's center through an outlet conduit 30. This completes the extraction of a fraction from the liquid. For some extraction processes, it is advantageous to connect multiple centrifuges in series or to recycle the raffinate through the extractor for extraction of additional fractions not originally extracted.

Since the liquid and solvent enter from a fixed shaft to a rotating shaft, these fluids each pass through mechanical seals. Unfortunately, when operating the extractor at the extraction pressures necessary to maintain the desired fraction dissolved in the liquefied gases or supercritical fluids, these seals tend to leak. Therefore, these extractors require special seals designed for high-pressure fluids. Furthermore, when using strong solvents such as, supercritical carbon dioxide, it is important to use silicone seals or other materials resistant to the solvent.

Optionally, a pressure vessel 40 houses the entire centrifugal extractor. A pump 42 pressurizes the entire housing 12 through a valve 44 and conduit 46 with any suitable gas such as air, carbon dioxide, inert gases and nitrogen. Pressurizing the entire centrifuge lowers the pressure differential at the seals to allow them to operate with internal pressures above their original design capability. Furthermore, placing the entire vessel in a pressure chamber allows operators to set the pressure at different levels for different solvents. When "ramping up",pressure within the chamber, it is important to increase pressure within the extractor at a similar rate to within the pressure chamber. An optional swing valve (not illustrated) between the inlet lines 24 and 26 and conduit 46 minimizes pressure differentials.

During operation, adjusting the rotational speeds of the centrifugal extractor determines the separation force between the fluids. Increasing the rotation speed however can decrease the mixing of the fluids in the chambers. Therefore, for each liquid extraction system, it is important to rotate the centrifuge at a rate that maximizes extraction from the liquid.

For small batch operations, it is possible to place the liquid supply and dense phase vessels within a pressure chamber. For continuous and large-scale operations however, supplying pressurized streams through the inlets 24 and 26 and removing pressurized streams through the outlets 28 and 30 allows effective extraction from high volumes of liquid.

Figure 2:
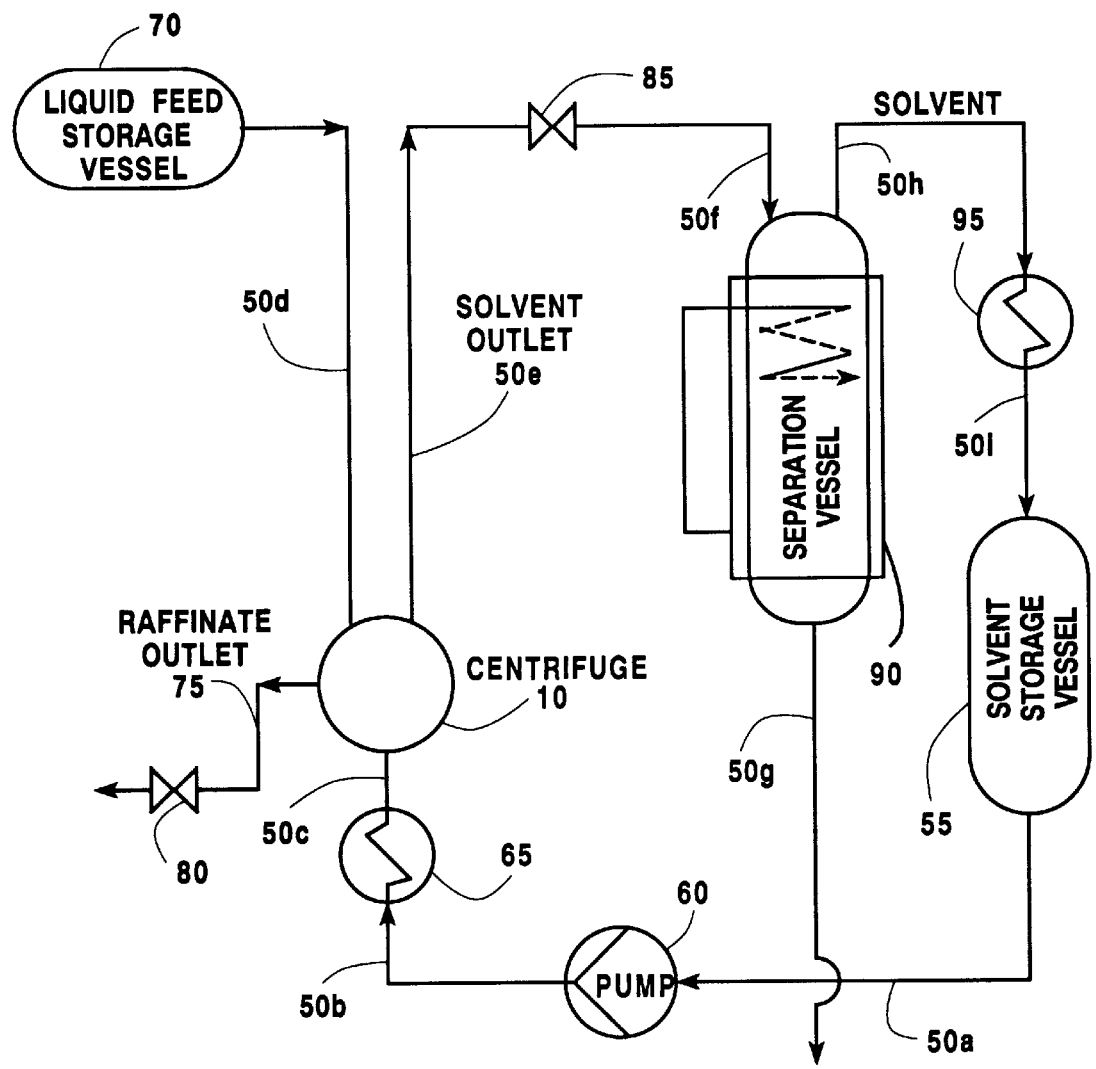
FIG. 2 is a schematic diagram of the apparatus and operation of the centrifugal extractor for removing fractions with liquefied gases and supercritical fluids.

Referring to FIG. 2, dense phase solvent, advantageously in its liquid or supercritical phase, flows through a conduit 50a from a supply or storage vessel 55 to a pump 60 where the pressure is adjusted to the desired operating pressure. The compressed dense phase solvent then flows from the pump 60 outlet via a conduit 50b through a preheater 65. The preheater adjusts the solvent temperature to the desired operating temperature. The heated solvent then flows through a conduit 50c into the light liquid phase inlet located near the periphery of the centrifugal extractor 10. The liquid feed is pumped from a storage vessel 70 through a conduit 50d and enters the centrifugal extractor 10 through its heavy phase inlet located near the central axis of the centrifuge. The two streams of product liquid and dense phase fluid flow in a countercurrent fashion aided by centrifugal force, as described previously. Consequently, a desired fraction of the liquid is dissolved in the dense phase solvent. The liquid feed, stripped of some fraction, exits the centrifugal extractor through an outlet located near the periphery of the drum and through the heavy phase outlet as a raffinate 75—for some extraction processes, the raffinate represents the desired end product. When operating the centrifuge at high internal pressures, the raffinate advantageously flows through a pressure reduction valve 80. The dense phase fluid solvent, containing a solubilized fraction from the liquid feed, exits the centrifugal extractor at an outlet located near the center of the drum and passes through the light phase outlet.

The loaded dense phase solvent passes via a conduit 50e across a pressure reduction valve 85 and via a conduit 50f into a separation vessel 90. This vessel decreases the pressure of the loaded dense phase solvent to convert it to a low density gas. At this separation pressure, the liberated gas separates from the previously dissolved material leaving an extract. The system removes extract through a conduit 50g. The stripped solvent phase exits the separation vessel as a gas through a conduit 50h. Then a heat exchanger 95 condenses the gas to its liquefied or supercritical phase. This condensed gas then travels through a conduit 50i to the storage vessel 55 for future extraction. The pump 60 then recycles this condensed gas through the preheater 65 for repeated extraction.

Thus, the present invention achieves the aforementioned objects and provides unexpected advantages in providing a process and apparatus that will permit the continuous processing of large volumes of liquids with dense phase fluids in a smaller, more compact device. Additionally, the invention provides an extraction process and apparatus that results in reduced processing costs due to increased production rates.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An apparatus for extracting a component from liquids comprising:

an inlet conduit for supplying a liquid, said liquid containing a desired fraction to be extracted therefrom;

a supply vessel for supplying a dense phase solvent for extractin said desired fraction, said dense phase solvent being chosen from the group consisting of supercritical fluids and liquefied gases;

a rotatable mixer connected to said inlet conduit and said supply vessel, said rotatable mixer having a centrifuge, said centrifuge having inlets for receiving said liquid and said dense phase solvent, a mixing chamber for dissolving said desired fraction into said dense phase solvent as a loaded solvent at an extraction pressure sufficient to maintain said desired fraction dissolved in said dense phase solvent and for separating loaded solvent from remaining raffinate, a raffinate outlet for discharging said raffinate and a solvent outlet for discharging said loaded solvent; and a separation vessel connected to said solvent outlet of said rotatable mixer for receiving said loaded solvent, said separation vessel having a separation pressure less than said extraction pressure of said centrifuge for converting said loaded solvent into a gas and said desired fraction and for liberating said desired fraction from said gas, wherein a pressure reduction valve connects said solvent outlet and said separation vessel for decreasing pressure in said separation vessel.

2. An apparatus for extracting a component from liquids comprising:

an inlet conduit for supplying a liquid, said liquid containing a desired fraction to be extracted therefrom;

a supply vessel for supplying a dense phase solvent for extracting said desired fraction, said dense phase solvent being chosen from the group consisting of supercritical fluids and liquefied gases;

a rotatable mixer connected to said inlet conduit and said supply vessel, said rotatable mixer having a centrifuge, said centrifuge having inlets for receiving said liquid and said dense phase solvent, a mixing chamber for dissolving said desired fraction into said dense phase solvent as a loaded solvent at an extraction pressure sufficient to maintain said desired fraction dissolved in said dense phase solvent and for separating loaded solvent from remaining raffinate, a raffinate outlet for discharging said raffinate and a solvent outlet for discharging said loaded solvent; and a separation vessel connected to said solvent outlet of said rotatable mixer for receiving said loaded solvent, said separation vessel having a separation pressure less than said extraction pressure of said centrifuge for converting said loaded solvent into a gas and said desired fraction and for liberating said desired fraction from said gas, wherein a pressure chamber connects said separation vessel to said supply vessel for pressurizing said gas back into said dense phase solvent and for resupplying said supply vessel.

\* \* \* \* \*